A. Pope.
Milk and Cream App's.
No. 86,860. Patented Feb. 9, 1869.
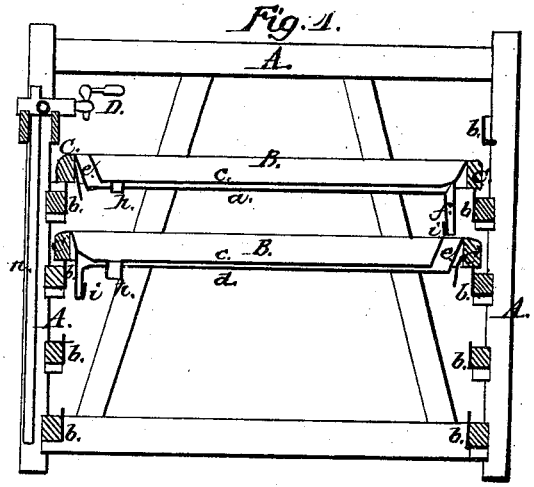
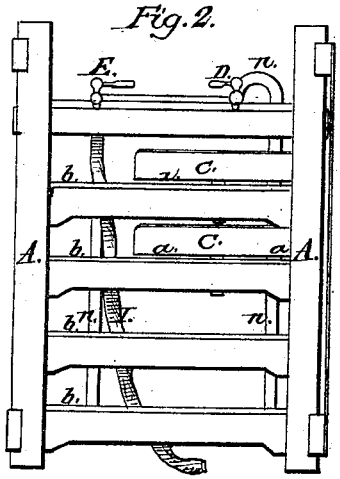
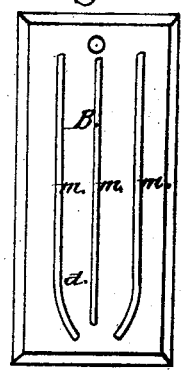
Witnesses:
Cornelius Cox
J. W. Stogle
Inventor:
Andrew Pope
by Alexander F. Mason
Attorney

United States Patent Office.

ANDREW POPE, OF RANDOLPH, NEW YORK.

Letters Patent No. 86,860, dated February 9, 1869.

IMPROVEMENT IN APPARATUS FOR OBTAINING CREAM FROM MILK.

The Schedule referred to in these Letters Patent and making part of the same.

*To all whom it may concern:*

Be it known that I, ANDREW POPE, of Randolph, in the county of Cattaraugus, and in the State of New York, have invented a certain new and useful Improvement in Apparatus for Obtaining Cream from Milk; and do hereby declare that the following is a full, clear, and exact description thereof, reference being had to the accompanying drawings, and to the letters of reference marked thereon.

The nature of my invention consists in the construction and general arrangement of an "apparatus for obtaining cream from milk."

In order to enable others skilled in the art to which my invention appertains, to make and use the same, I will now proceed to describe its construction, and the manner in which the same is or may be operated, referring to the annexed drawings, which form a part of this specification, and in which—

Figure 1 is a longitudinal vertical section;

Figure 2 is an end elevation;

Figure 3 is a plan view of the pan, the upper bottom removed; and

Figure 4 is an end view, in section, of the same.

My plan is to keep the milk at a proper temperature, by the use of cold and warm water, and to manage the business of butter-making with less expense.

To do so, I erect a rack, A, in the milk-room, of suitable size to contain the milk from any number of cows.

Upon this rack, I place a suitable number of long pans or vats, B, one above another, which pans are of such size that each one will hold, at one filling, all the milk from the whole number of cows, that the dairyman is disposed to place in the rack; or, if the dairy is very large, two or more racks may be used, when the milk of from ten to twenty cows is placed upon each.

Each pan has its own rack or car C, provided with grooved metallic pulleys or rollers *a a*, running on an iron track, *b*, in the sides of the main rack A. The car C, with its pan, is moved back on the main rack, or drawn forward, at pleasure.

Every pan is made alike, with two bottoms, *c* and *d*, leaving a space between them, of about one-eighth or one-fourth of an inch in height, throughout the whole surface of their bottoms. This space is to be filled with water, either cold or warm, varying as the season requires, so as to keep the milk of a proper temperature to raise its cream. The cold water may be thrown from a spring by an hydraulic ram, or from a well by a pump, and in many places it may be conducted in pipes, and fall in of its own weight.

The quantity of water is regulated by a faucet, D, from which it falls into a perpendicular tube, *e*, at the end of the top pan, which tube is connected with the space between the bottoms *c* and *d*.

The water then flows gently to its opposite end, from where it issues through a perpendicular pipe, *f*, and falls into the tube *e* on the next pan below.

The warm water is poured in at the top pan, also, when needed, and thus it is conveyed from pan to pan, for instance, first to the right, then to the left, and down through as many pans as may be necessary to store the milk, until the first milk set is ready, and may be skimmed.

Four pans to each rack appears, from experience, to be about a sufficient number, and will store all the milk of the dairy for forty-eight hours' time, or until the cream has risen on the first pan filled. Then, the cream is taken off, as the use of the pan is again necessary to store the milk from the next milking.

When the operation of setting the milk is commenced, the pans are all placed on their several cars, where they may remain from year to year, without removal, and moved back on the main rack, so that, when the faucet is open, the water flows continually from one pan to another, passing through the space of each, down through the last and lowest, from which it is discharged anywhere desired.

The first or top pan is calculated to be filled first, and the water started; then, as each other pan is to be filled, the water can be turned off, in an instant, by the governing-faucet, so that any other pan may be drawn forward at the next or any other milking.

The rail *b*, on the main rack, may be made of wood and metal combined, or metal alone. I prefer using an iron rail, as the rack can be put up much cheaper when the iron rail can be had; but I reserve to myself the right to use any kind of rail answering the same purpose.

The sag in the bottom of the pan, which is plainly shown in fig. 4, is for a double purpose: It serves to carry off the water, which condenses on the pan in warm weather, into the spout *i* underneath, which spout is attached on the outside of the pipe *f*, so that the condensed water passes down with the regular stream into the pan below. The other purpose is for convenience in emptying the milk, and the water used in cleaning the pans; for, when it is necessary to skim, the water is quickly turned off by the governing-faucet, the pan moved forward, the cream removed, a pipe or tube attached to the issue *h*, (which may be placed at any point desired, the but most convenient place is in the centre of the bottom,) the issue of the pan opened, and the milk is soon discharged in pipes, through the floor or walls of the milk-room, to the swill-tub, or perhaps to the hog-pen.

Next in order is the cleansing of the pan, which may be done with cold water, especially in hot weather; for, as the pan is kept cold, enough moisture is condensed from the atmosphere, on its sides, to prevent the cream from drying on, and therefore is easily rinsed off in cold water, which may be discharged, through a rubber hose, in abundance to either pan, and at the same time be constantly carried off by the milk-spout attached to the issue *h*, which spout is not to be taken off until the pan is cleansed; but a loose or movable spout is necessary to turn the cleansing-water from the swill-barrel.

The issue $h$, in the bottom of the pan, may be closed by a cork, or, a better way is to have a short thumb-screw, which screws inside the issue, with a square shoulder, and a rubber collar on the shoulder, for packing, which will screw down very tight, and hold the milk perfectly in the pans.

In the space between the bottoms $c$ and $d$ is placed a series of rods, $m$ $m$, forming channels, so that the water, in passing through, may heat or cool the whole surface.

At one end of the main rack A, I have attached pipes $n$ $n$, to show how the water is or may be conducted to the pans.

To these pipes, two faucets are attached, one, D, the governing-faucet, and the other, E, to which a rubber hose, I, is attached, for use in cleansing the pans.

The advantages of this apparatus are obvious, and I will only mention some of the most important.

In this manner, more butter can be made from the milk than in the ordinary way, for the reason that the milk is kept sweet until the cream has all risen, while, in the ordinary way, it sours, and never can be raised; and besides, there is much less loss of cream by adhering to the pans, as there is very much less surface, and, in skimming, a saving in particles of cream left on the milk, in proportion to its surface, and in the time consumed in skimming.

As the milk is kept cool, it operates to condense moisture from the atmosphere, which keeps the cream from drying; hence, a saving of particles of dried cream. Besides this, there is a great saving by the cream being kept sweet, as the butter is of far better quality, will keep longer, and bring a better price.

Next comes a great saving of annual drudgery to the dairyman, by passing the skimmed milk from its pan through pipes to the swill-tub, without lifting an ounce of it; and, again, a great saving of time and labor in washing the pans, as they are perfectly and speedily cleansed with cold water, discharged through the rubber hose. I say a great saving, for only the inside is to be washed, while, with the pans heretofore used, both the outside and inside have to be washed.

My pans, being very large, require, besides, only about half the tin to be made to hold the same quantity of milk as if the pans were made of the ordinary size and shape.

Having thus fully described my invention,

What I claim as new, and desire to secure by Letters Patent, is—

1. The combination of the rack A, rails $b$ $b$, cars C C, with grooved rollers $a$ $a$ and pans B B, all constructed and arranged substantially as and for the purposes herein set forth.

2. Constructing a milk-temperer of a series of pans or vats, placed one above the other, in such a manner that the tempering-fluid may flow from one end of the pan to the other, then to the next pan, and so on through all the pans, without coming in contact with the milk, substantially as and for the purposes herein set forth.

In testimony that I claim the foregoing, I have hereunto set my hand, this 7th day of November, 1868.

ANDREW POPE.

Witnesses:
    J. E. WEEDEN,
    E. L. MATTESON.